The specification of this patent is not in print
8216X
PATENTED MAY 24, 1834.
J. BONNEY.
BREAKING AND WORKING HIDES AND SCOURING LEATHER.
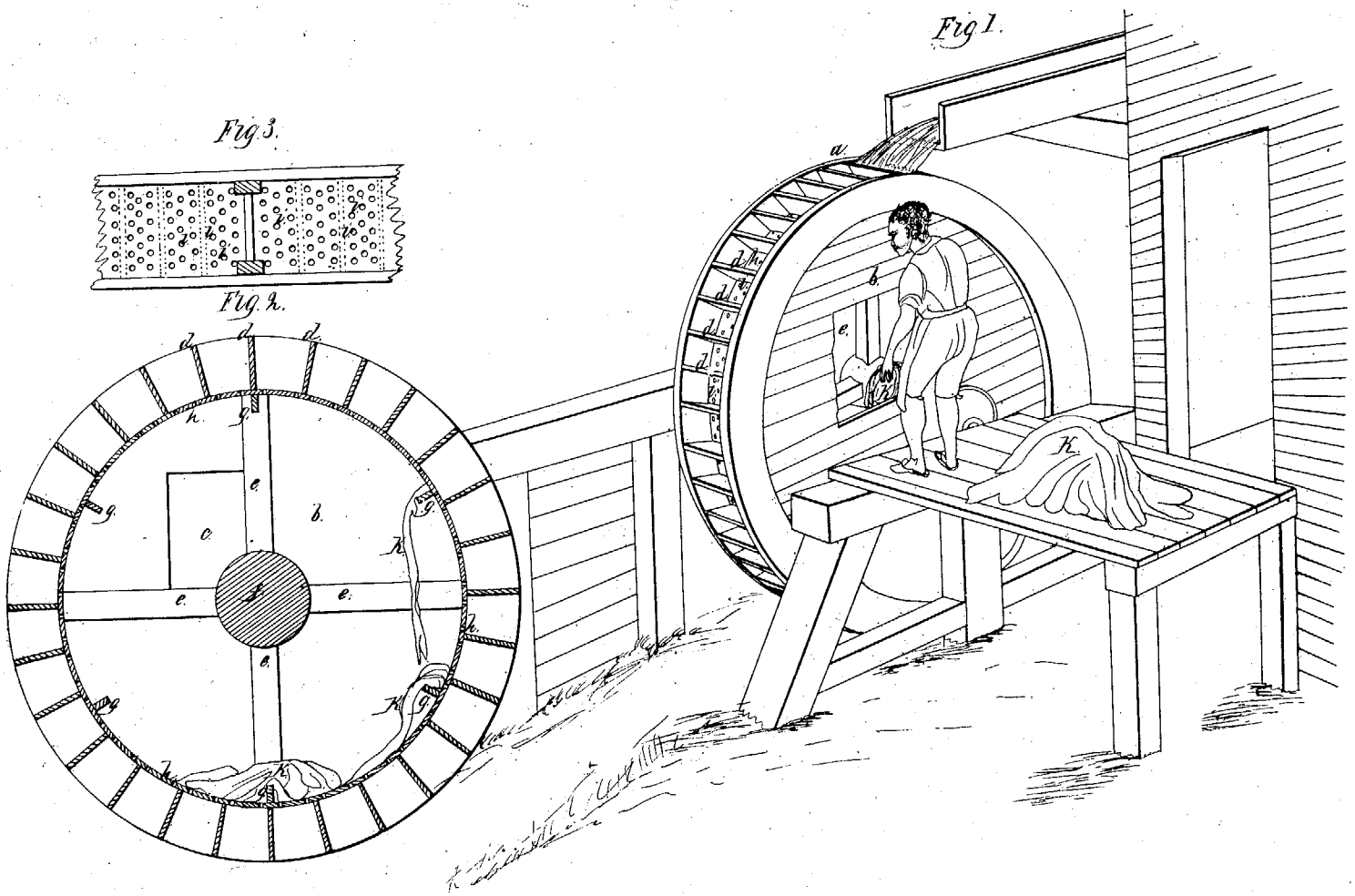
THE NORRIS PETERS CO., PHOTO-LITHO., WASHINGTON, D. C.

Josiah Benney, Cornwall Conn.
Letters Patent

The Schedule referred to in these Letters Patent and making part of the same Containing a description in the words of the said Josiah Benney him-self of his Improvement in the machine for breaking and working hides and [illegible] Leather –

To all to whom these presents shall come Be it known that I Josiah Benney of Cornwall County of Litchfield and State of Connecticut have invented a new and useful improvement in the art of breaking and working Hides and [illegible] Leather and the following is a full and exact description of the operation in said art as discovered and invented by me.

The machine that the inventor would make use of in said art may be represented by a common overshot or breast water wheel fourteen feet in diameter with two sets of arms. The space inside or between the arms should be two and a half feet; the wheel should be enclosed by siding up on the outside of the arms from the shrouding to the shaft except on one side near the shaft where there should be an opening two by three feet where the hides or Leather may be put into the wheel. Inside of the wheel and upon the lining of the buckets once in about [illegible] feet there should be a slat reaching across the inside of the wheel two inches and a half thick and four inches [illegible]. —

The use of these slats is to carry up the leather or stock as the wheel revolves. There may be holes in the lining of the buckets through which water may be received inside the wheel as may be necessary for the stock to be worked. The discoverer [illegible] [illegible] to break hides and prepare them for the liming to [illegible] and cleanse them from the lime and to [illegible] the tanning [illegible]

[illegible]

[illegible] [illegible] this wheel. When by Continual rolling and falling (as [illegible] [illegible]) the work is done with safety Neatness and des-patch. The inventor would apply the same process to the fulling of Cloth. It is not necessary that this process should be performed in a [illegible] wheel. it may be detached & of different forms such as triangular, square oval &c. and moved by any power Convenient. What the inventor would by Patent secure to himself is the process of beating and working hides, scouring leather and fulling cloth by a continual rolling beating or falling (in a wheel or equi-valent machine) as above specified and described.

Witnesses
[illegible] Harrison
[illegible] Chandler

Josiah Benney

507 [illegible]